(12) United States Patent
Rudi

(10) Patent No.: US 6,206,313 B1
(45) Date of Patent: Mar. 27, 2001

(54) TAPE CARTRIDGE ALLOWING CONCURRENT READING/WRITING ON MULTIPLE TAPES

(75) Inventor: Guttorm Rudi, Fjellhamar (NO)

(73) Assignee: Tandberg Data ASA, Oslo (NO)

( * ) Notice: Subject to any disclaimer, the term of this patent is extended or adjusted under 35 U.S.C. 154(b) by 0 days.

(21) Appl. No.: 09/275,975

(22) Filed: Mar. 25, 1999

(51) Int. Cl.[7] .................................................. G03B 23/02
(52) U.S. Cl. ............................................ 242/341; 360/132
(58) Field of Search ................................... 242/341, 342, 242/343, 342.1, 343.2, 345, 345.1, 346, 347; 360/132, 96.1

(56) References Cited

U.S. PATENT DOCUMENTS

| | | | |
|---|---|---|---|
| 4,074,876 | * 2/1978 | Gourley | 360/132 X |
| 4,195,796 | * 4/1980 | Osanai | 242/347 X |
| 5,284,308 | * 2/1994 | Comeaux et al. | 360/132 X |
| 5,911,379 | * 6/1999 | Adams | 242/346 |
| 5,963,395 | * 10/1999 | Rudi | 360/132 X |
| 5,979,814 | * 11/1999 | Childers | 242/346 X |
| 5,982,576 | * 11/1999 | Rudi | 360/132 X |

FOREIGN PATENT DOCUMENTS

| | | | |
|---|---|---|---|
| 64-66884 | * | 3/1989 | (JP) . |
| 64-66885 | * | 3/1989 | (JP) . |

OTHER PUBLICATIONS

Abstract for Japanese Application 62222543, Takahashi, Mar. 1989.
Abstract for Japanese Application 62222544, Takahashi, Mar. 1989.

* cited by examiner

*Primary Examiner*—William A. Rivera
(74) *Attorney, Agent, or Firm*—Schiff Hardin & Waite

(57) ABSTRACT

A multi-tape cartridge has a number of tapes therein which are either wound in common on a single hub, or are wound individually on respective hubs, and proceed in the housing along respective tape paths from the commonly wound hub, or the individual hubs, to respective take-up hubs also disposed in the housing. One of the sidewalls of the housing has openings therein so as to expose the respective tape paths, followed by the tapes, to an exterior of the housing, thereby allowing data transfer heads to be inserted into the opening so as to engage the magnetic tapes to read data therefrom or write data thereon.

11 Claims, 1 Drawing Sheet

TAPE CARTRIDGE ALLOWING CONCURRENT READING/WRITING ON MULTIPLE TAPES

BACKGROUND OF THE INVENTION

1. Field of the Invention

The present invention is directed to a tape cartridge or cassette, such as a magnetic tape cartridge or a cassette of the type suitable for use in a drive known as a tape "streamer," and in particular to a such a tape cartridge or cassette containing multiple tapes for use with a drive having multiple data transfer heads respectively engageable with the multiple tapes.

2. Description of the Prior Art and Related Applications

The need for storing all types of digital information is increasing rapidly. Magnetic tape is by far the least expensive high-capacity medium available today for digital information storage. The suppliers of tape drive and tape medium are always striving to develop new drives with increased storage capacity, shorter access time and higher data rates.

A primary advantage of tape, in addition to its low cost, as an information storage medium is its relatively large recording surface area.

A significant disadvantage of tape as an information storage medium is that tape is a sequential medium. This means that when a data transfer head, such as a read/write head being operated as a read head, is located at a beginning of a tape, it is necessary for the tape to pass along virtually its entire tape length in order to retrieve information at the end of the tape. The access time associated with tape is therefore much longer than the access time associated with hard disks, optical disks and flexible (floppy) disks.

Access time associated with a tape can, at least in theory, be improved by making the tape wider and shorter, so that it takes less time to transport the tape to reach the end of the tape in order to retrieve information located at the end of the tape. There are, however, practical limits to making a tape wider and shorter.

One problem is that the dimensions of the tape, and consequently the dimensions of the cartridge containing the tape, have an influence on the form factor of the drive. A wider tape requires an increased form factor. Consistent with current marketplace desires, the current trend in the industry, however, is to reduce the form factor. Moreover, in library systems the cartridges are stored in magazines, usually with ten cartridges per magazine. Such magazine storage would have to be reconfigured if wider tape, and thus wider cartridges, were employed.

Another problem is that increasing the tape width also increases the air cushion which is unavoidably created between the exterior surface of the tape on the take-up reel and the incoming tape which is being wound onto the take-up reel. In the confined V-shaped space at this location, air which is carried along the surfaces of the rapidly-moving tape becomes entrapped and forms a cushion which pushes the incoming tape slightly away from the wound tape. Increasing the width of the tape would make this trapped volume larger, and thereby increase the cushion effect. This may result in the tape not being firmly wound onto the take-up reel, which can subsequently result in a tape pack shift if the cartridge is subsequently subjected to shock and vibration. As is known to those of skill in this art, a tape pack shift can result in the occurrence of mis-tracking when the tape is subsequently unwound and read.

Another theoretical way to increase the data transfer rate is to use an increased number of write/read heads in parallel. It is well-known, however, that the manufacturing yield of conventional heads decreases, often dramatically, as the number of channels accommodated within the head increases. Employing a wider tape would require the use of an increased number of heads operating in parallel to adequately cover the increased tape width.

Another problem associated with increasing the tape width is that the head-to-tape contact pressure is very difficult to maintain uniformly from the lower tape edge to the upper tape edge. This is due to head tilt (zenith) tolerances and tape transverse cupping and tension.

The above problems are addressed in two co-pending applications which are assigned to the same assignee, Tandberg Data ASA, as the present application. A multiple tape cartridge and drive system is described in co-pending application Ser. No. 09/006,459, filed Jan. 13, 1998 ("Multiple Tape Cartridge and Drive System Wherein Tapes are Extracted from the Cartridge," Rudi), in which a mechanism is provided to withdraw the multiple tapes from the cartridge to an exterior hub. The multiple tapes are temporarily affixed to the hub and the hub is rotated to unwind the multiple tapes from the hubs in the cartridge housing. Space is provided for a number of data transfer (read/write) heads to be moved adjacent to the respective tapes in a region between the cartridge and the exterior hub, so that data transfer can take place. When a data transfer operation is completed, the tapes are detached from the exterior hub and are returned to the inside of the cartridge.

In another co-pending application, Ser. No. 09/041,689 filed Mar. 13, 1998 ("Multiple Tape Cartridge and Drive for Concurrent Recording with the Tapes Disposed in the Cartridge," Rudi) the cartridge housing is provided with an access opening into which multiple data transfer heads can be simultaneously inserted. When inside the housing, each data transfer head is adjacent the tape transport path traversed by one tape, among multiple tapes, which are wound in overlapping fashion on two reels in the housing. The tapes thus always remain in the housing, even during data transfer.

In another co-pending application, Ser. No. 09/080,352, filed May 18, 1998 ("Multi-tape Cartridge And Multi-head Drive For Concurrent Data Transfer To/from Multiple Tapes," Rudi), a magnetic tape cartridge and drive are disclosed, wherein the tape cartridge has multiple tapes wound in common on a single hub, the tapes engaging respective further hubs which are disposed around the periphery of the cartridge housing. A number of drive motors are provided equal in number to the total number of tape hubs, for driving the peripheral hubs to withdraw multiple tapes from the commonly wound hub, and to drive the commonly wound hub to wind the multiple tapes thereon. In all embodiments described in this application, the hub having multiple tapes wound thereon is disposed in a central region of the cartridge housing, with the other hubs, onto which the tapes are respectively wound individually, being distributed around the commonly-wound hub, at a peripheral region of the cartridge housing.

Many types of robotics systems are available for cartridge handling and manipulation, such as so-called loader and library systems. For these types of systems, currently two cartridge form factors are particularly important, these being the DLT cartridge, commercially available from Quantum, and the IBM 3840/3490 cartridge. Both of these cartridges employ tape which is one-half inch in width. A large number of loader/library systems currently in use are designed to handle cartridges having a form factor corresponding to these standardized cartridges.

An advantage of these cartridge types is that they have a large available recordable surface area which is available, compared to other cartridge types and other media types. A disadvantage of these types of cartridge, however, is that the data transfer rate is limited because the number of data transfer (read/write) heads is limited which can be used in parallel for a one-half inch tape. Another disadvantage of these standardized cartridge types is that in order to obtain access to data at the end of the tape, it is necessary to unwind (or rewind) the entire tape length, which is approximately 2,000 feet. An unavoidable delay is therefore associated with obtaining access to data at this location on the tape.

Moreover, these standardized cartridges are of a type wherein the tape is extracted from the cartridge, and is wound onto a take-up hub located remote from the cartridge in the drive, and thus before the cartridge can be unloaded (removed from the drive), the tape must be completely rewound and returned to the cartridge. Moreover, the tape threading mechanism associated with cartridges of this type is very complex, and this complex threading mechanism imposes a lower limit for tape thickness, and thus also imposes a lower limit for tape length.

Recently, HP, IBM and Seagate have jointly introduced the so-called Linear Tape-Open (LTO) technology. This technology is available in two basic formats, a so-called Ultrium format, which has up to 200 GB capacity, and a so-called Accelis format, which has an access time under 10 seconds. The cartridge format or "footprint" for the Ultrium format is the aforementioned IBM 3480/3490 standardized format. The magnetic tape in each of these formats is ½" tape, with the tape in the Ultrium format being wound on a single reel, and the tape in the Accelis format being wound on dual reels.

SUMMARY OF THE INVENTION

It is an object of the present invention to provide a multi-tape cartridge having a housing form factor which is identical to the standardized form factor used in conventional loader/library systems, and which will also be compatible with LTO technology, wherein there is no need to extract the multiple tapes from the interior of the cartridge in order to effect data transfer.

The above object are achieved in accordance with the principles of the present invention in a multi-tape cartridge having a housing with outer dimensions matched to receive the cartridge or cassette in a standardized system and having, in preferred embodiments, a commonly wound hub on which at least two magnetic tapes are wound in common, and a number of other hubs, equal in number to the number of magnetic tapes in the housing, onto and from which the respective tapes are individually wound and unwound. Each magnetic tape follows a path proceeding to and from the commonly wound hub to one of the individually wound hubs, which causes the tape to proceed close to a sidewall of the cartridge housing. An opening is provided at an appropriate location in this sidewall, allowing a magnetic data transfer head to move through the opening into and out of contact with the individual magnetic tape, so as to effect writing of data on, and reading of data from, the individual tape. In another embodiments, the housing also has dimensions for a standardized format, but contains two pairs of hubs, with a first tape being wound and unwound between the hubs of a first of these pairs, and a second tape being wound and unwound from the hubs of a second of these pairs. Again, in the winding/unwinding path, the individual tapes are guided so as to proceed close to a sidewall of the cartridge, this sidewall having openings therein allowing access by respective data transfer heads to each of the individual tapes.

DESCRIPTION OF THE PREFERRED EMBODIMENTS

Figure 1:
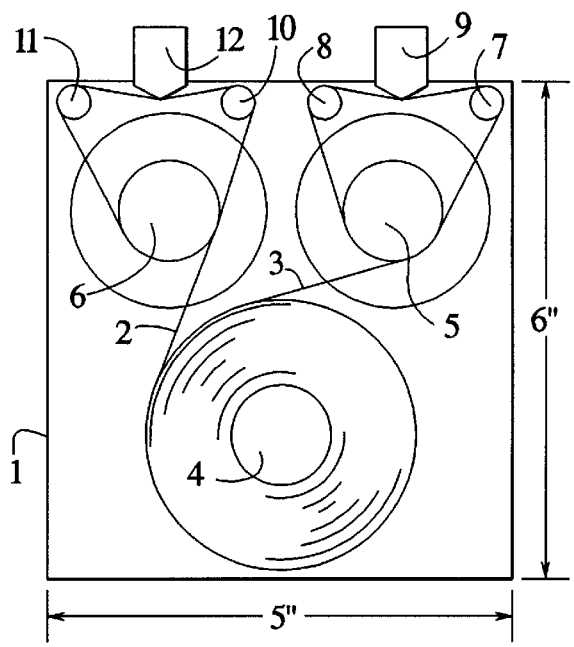
FIG. 1 is a schematic illustration showing the interior components and dimensions of a first embodiment of a multi-tape cartridge in accordance with the invention, engaged with two data transfer heads.

In the embodiment shown in FIG. 1, a cartridge or cassette housing 1 has exterior dimensions of 5"×6". This housing therefore has a form factor with the maximum allowable dimensions for the standardized 5¼drive form factor.

Contained within the housing 1 are a first hub 4, and a second and third hubs 5 and 6. The first 4 has two magnetic recording tapes 2 and 3 wound thereon in common. The tape 3 proceeds from the hub 4 around tape guides 7 and 8, to the hub 5 on which it is individually wound (and from which it is individually unwound). The magnetic tape 2 proceeds around tape guides 10 and 11 to the hub 6, on which it is individually wound (and individually unwound).

Each of the hubs 4, 5 and 6 are engageable with respective drive motors of a suitably constructed drive (not shown). The drive can be constructed in accordance with the disclosure of the aforementioned co-pending U.S. application Ser. No. 09/080,352.

In its transport path between the hub 4 and the hub 5, the magnetic tape 3 is caused by the guides 7 and 8 to proceed next to a sidewall of the housing 1. This sidewall of the housing 1 is provided with an opening to allow a data transfer head 9 to come into contact with the magnetic tape 3, to write data on the magnetic tape 3 and to read data from the magnetic tape 3, in a known manner. Similarly, the guides 10 and 11 cause the magnetic tape 2 to proceed next to the same side of the housing 1, at which another opening is disposed allowing access of another data transfer head 12 to the magnetic tape 2.

A total tape length of 661 meters can be accommodated in the housing 1 in the embodiment of FIG. 1.

Figure 2:
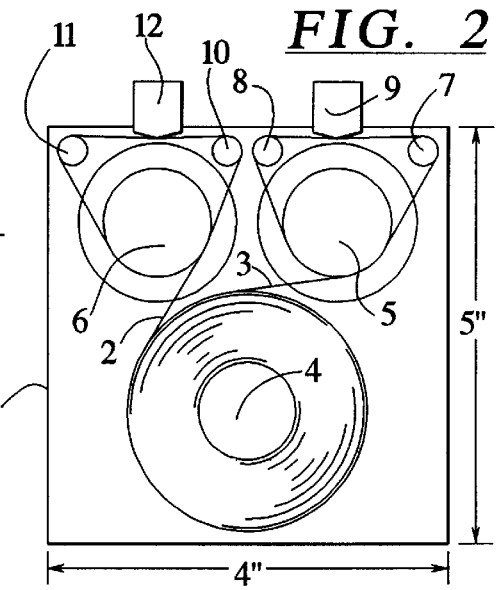
FIG. 2 is a schematic illustration showing the interior components and dimensions of a second embodiment of a multi-tape cartridge in accordance with the invention, engaged with two data transfer heads.

The embodiment of FIG. 2 has the same basic structure, and the same components are identified with the same reference numerals, as the embodiment of FIG. 1, but the embodiment of FIG. 2 has a different form factor. The embodiment of FIG. 2 has a cassette or cartridge housing 13 with exterior dimensions of 4"×5". The embodiment of FIG. 2 thus has a form factor which is compatible with the standard for the aforementioned LTO Ultrium format as well as conventional Storage Tek 9840 cartridges. This format is therefore compatible with standard automation equipment, i.e., loader/library equipment.

Figure 3:
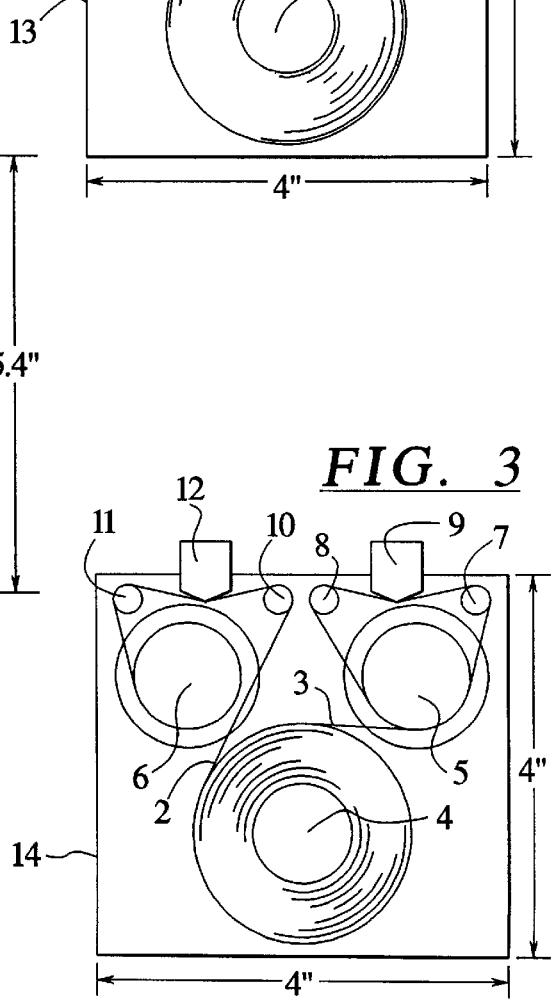
FIG. 3 is a schematic illustration showing the interior components and dimensions of a third embodiment of a multi-tape cartridge in accordance with the invention, engaged with two data transfer heads.

The embodiment of FIG. 3 has yet another form factor, but otherwise has the same basic structure and components as the embodiments of FIGS. 1 and 2, and therefore identical components have been provided with the same reference numerals as used in FIGS. 1 and 2. In the embodiment of FIG. 3, the cartridge or cassette housing 14 has exterior dimensions of 4"×4". The embodiment of FIG. 3 therefore has a form factor which is compatible with the standard DLT cartridge standard for automation equipment (i.e., loader/library equipment).

Figure 4:
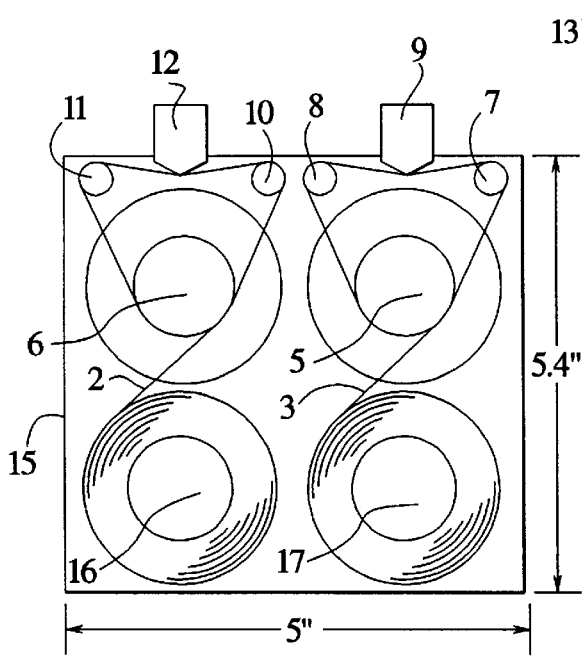
FIG. 4 is a schematic illustration showing the interior components and dimensions of a fourth embodiment of a multi-tape cartridge in accordance with the invention, engaged with two data transfer heads.

In the embodiment of FIG. 4, instead of having a hub on which two tapes are wound in common, a hub 16 is provided, which is paired with the hub 6 and between which the magnetic tape 2 is wound and unwound, as well as a hub 17, which is paired with the hub 5, and between which the magnetic tape 3 is wound and unwound. As in the previous embodiments, however, the magnetic tapes 2 and 3 are respectively guided so as to proceed next to a side of the housing 15, so as to be respectively engageable with data transfer heads 12 and 9.

In the embodiment of FIG. 4, the cartridge or cassette housing 15 has exterior dimensions of 5"×5.4". This embodiment therefore has a form factor which can accommodate two pairs of Accelis-type hubs and guides, and it is therefore compatible with conventional Accelis cartridges.

All of the above embodiments employ tape having a tape width of ½". The embodiment of FIG. 2 accommodates a total tape length of 351 meters, the embodiment of FIG. 3 accommodates a total tape length of 216 meters, and the embodiment of FIG. 4, like the embodiment of FIG. 1, accommodates a total tape length of 661 meters.

The following chart compares structural and performance information for each of the four embodiments, and also compares performance characteristics for the four embodiments against the second generation LTO Accelis format, as a reference. In the chart, the designation "X" indicates that the listed performance characteristic for the particular embodiment is the designated multiple of the same performance characteristic for the LTO Accelis reference.

| FIG. | Housing Dimensions | Compatibility | Capacity | Transfer Rate | Access Time | Tape Length | Tape Width |
|---|---|---|---|---|---|---|---|
| 1 | 5' × 6" (new) | 5¼" Drive | 245 GB (4.9×) | 40–80 MB/S (2×) | 12 sec. (1.5×) | 661 m | ½" |
| 2 | 4" × 5" (Ultrium STK 9840) | Loader/Library | 129 GB (2.58×) | 40–80 MB/S (2×) | 6.4 sec. (0.8×) | 351 m | ½" |
| 3 | 4" × 4" (DLT) | Loader/Library | 90 GB (1.58×) | 40–80 MB/S (2×) | 4 sec (0.5×) | 216 m | ½" |
| 4 | 5" × 5.4" (New) | Accelis | 254 GB (4.9×) | 40–80 MS/S (2×) | 12 sec (1.5×) | 661 m | ½" |

As in the embodiment of FIG. 1, each of the embodiments of FIGS. 2, 3 and 4 is used with a suitably constructed drive having a number of drive motors equal in number to the number of hubs. These drives can be constructed according to the teachings of the aforementioned co-pending application Ser. No. 09/080,352.

Although modifications and changes may be suggested by those skilled in the art, it is the intention of the inventor to embody within the patent warranted hereon all changes and modifications as reasonably and properly come within the scope of his contribution to the art.

I claim as my invention:

1. A multi-tape cartridge comprising:
   a housing having a plurality of sidewalls;
   a first hub rotatably mounted in said housing;
   a plurality of magnetic tapes wound in overlapping fashion on said first hub, each of said plurality of magnetic tapes having a free end;
   a plurality of further hubs, equal in number to said plurality of magnetic tapes, rotatably mounted in said housing at respective locations between said first hub and said sidewalls, the free ends of said plurality of magnetic tapes being respectively connected to said further hubs with said magnetic tapes proceeding along respective tape paths from said first hub to said respective further hubs; and
   a plurality of openings in one of said sidewalls of said housing, equal in number to said plurality of magnetic tapes, respectively disposed at locations exposing the respective tape paths to an exterior of said housing.

2. A multi-tape cartridge as claimed in claim 1 wherein said plurality of magnetic tapes comprises two magnetic tapes.

3. A multi-tape cartridge as claimed in claim 1 further comprising a plurality of sets of tape guides disposed in said housing between said one of said sidewalls and said further hubs, and said sets of tape guides respectively defining a portion of the respective tape paths to guide the respective magnetic tapes past said plurality of openings.

4. A multi-tape cartridge as claimed in claim 1 wherein said plurality of sidewalls define a rectangle and wherein said housing has exterior dimensions of 5"×6".

5. A multi-tape cartridge as claimed in claim 1 wherein said sidewalls define a rectangle, and wherein said housing has exterior dimensions of 4"×5".

6. A multi-tape cartridge as claimed in claim 1 wherein said sidewalls define a square, and wherein said housing has exterior dimensions of 4"×4".

7. A multi-tape cartridge comprising:
   a housing having a plurality of sidewalls;
   a first hub rotatably mounted in said housing;
   first and second magnetic tapes wound in overlapping fashion on said first hub, each of said first and second magnetic tapes having a free end;
   a second hub rotatably mounted in said housing at a location between said first hub and one of said sidewalls, said free end of said first magnetic tape being connected to said first hub and said first magnetic tape proceeding along a first tape path from said first hub to said second hub;
   a third hub, rotatably mounted in said housing between said first hub and said one of said sidewalls, said free end of said second magnetic tape being connected to said third hub and said second magnetic tape proceeding along a second tape path from said first hub to said third hub; and said one of said sidewalls having a first opening disposed at a location exposing said first tape path to an exterior of said housing and a second opening disposed at a location exposing said second tape path to said exterior of said housing.

8. A multi-head tape cartridge as claimed in claim 7 further comprising a first pair of tape guides disposed in said housing on opposite sides of said first opening and guiding said first magnetic tape in a section of said first tape path past said first opening substantially parallel to said one of said sidewalls, and a second pair of tape guides disposed on opposite sides of said second opening and guiding said second magnetic tape in a portion of said second tape path past said second opening substantially parallel to said one of said sidewalls.

9. A multi-tape cartridge as claimed in claim 7 wherein said plurality of sidewalls define a rectangle and wherein said housing has exterior dimensions of 5"×6".

10. A multi-tape cartridge as claimed in claim 7 wherein said sidewalls define a rectangle, and wherein said housing has exterior dimensions of 4"×5".

11. A multi-tape cartridge as claimed in claim 7 wherein said sidewalls define a square, and wherein said housing has exterior dimensions of 4"×4".

* * * * *